United States Patent

Ohyama et al.

[11] Patent Number: 5,183,474
[45] Date of Patent: Feb. 2, 1993

[54] HEAT-SENSITIVE SUBLIMATION TRANSFER CYAN DYE AND TRANSFER SHEET

[75] Inventors: Tsukasa Ohyama, Omuta; Yasushi Shimokawa, Miike; Isamu Ghoda, Kobe; Keisuke Takuma, Omuta; Hitoshi Koshida, Nishinomiya, all of Japan

[73] Assignee: Mitsui Toatsu Chemicals Inc., Tokyo, Japan

[21] Appl. No.: 700,153

[22] PCT Filed: Sep. 12, 1990

[86] PCT No.: PCT/JP90/01166
§ 371 Date: May 13, 1991
§ 102(e) Date: May 13, 1991

[87] PCT Pub. No.: WO91/04301
PCT Pub. Date: Apr. 4, 1991

[30] Foreign Application Priority Data
Sep. 13, 1989 [JP] Japan ................ 1-235559
Dec. 12, 1989 [JP] Japan ................ 1-320608

[51] Int. Cl.$^5$ .................... B41M 5/38; C09B 53/02
[52] U.S. Cl. .................... 8/471; 428/195; 428/211; 428/913; 428/914; 503/227
[58] Field of Search ............. 8/471; 503/227; 428/195

[56] References Cited

U.S. PATENT DOCUMENTS

| | | | |
|---|---|---|---|
| 4,829,047 | 5/1989 | Niwa et al. | 503/227 |
| 4,987,120 | 1/1991 | Mikoshiba et al. | 503/227 |
| 5,034,371 | 7/1991 | Tanaka et al. | 8/471 |

FOREIGN PATENT DOCUMENTS 60-239289 11/1985 Japan.
63-199687 8/1988 Japan.

OTHER PUBLICATIONS

Patent Abstracts of Japan, vol. 12, No. 478 (M-775) (3325), Dec. 14, 1986 and JP-A-63 199687, Aug. 18, 1988.
Patent Abstracts of Japan, vol. 10, No. 109 (M-472) (2166) Apr. 23, 1986 and JP-A-60 239289, Nov. 28, 1985.

Primary Examiner—A. Lionel Clingman
Attorney, Agent, or Firm—Millen, White, Zelano and Branigan

[57] ABSTRACT

Described herein are heat-sensitive sublimation transfer cyan dyes represented by the following formula (I):

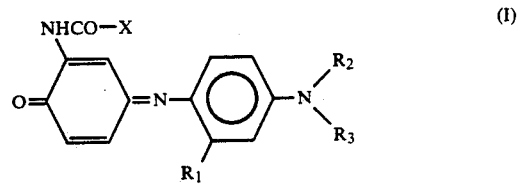

wherein $R_1$ represents a hydrogen atom, an alkyl group, an alkoxyl group, an alkylcarbonylamino group, a formylamino group or a halogen atom, $R_2$ and $R_3$ represent an alkyl group, an alkenyl group, an alkoxyalkyl group, an aralkyl group, an aryl group, a halogenoalkyl group or a cyanoalkyl group or are coupled together to form a ring, and X represents any one of the following groups:

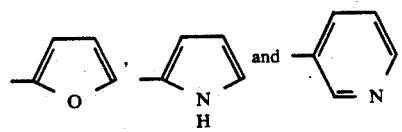

Heat-sensitive sublimation transfer sheets containing one or more dyes selected from the group of the above dyes are also described.

16 Claims, No Drawings

HEAT-SENSITIVE SUBLIMATION TRANSFER CYAN DYE AND TRANSFER SHEET

DESCRIPTION

1. Technical Field

This invention relates to a heat-sensitive, sublimation transfer cyan dye useful in color hard copies by the thermal, sublimation transfer recording process and also to a transfer sheet therefor.

2. Background Art

The thermal transfer process making use of sublimable dyes is one of thermal transfer printing processes, which comprises coating a condenser paper sheet, whose thickness is several micrometers, or a PET film with a sublimable dye in the form of an ink and then selectively heating the sublimable dye by a thermal head to transfer it to a recording paper sheet. The thermal transfer process is now used as a means for recording various image information as tangible images as hard copies.

Characteristic features of sublimable dyes usable in the thermal transfer process include the availability of a wide variety of colors, excellent mixability, strong dyeability and relatively high stability. In particular, the thermal transfer process has a major characteristic feature not available from the other photographic printing processes in that the amount of a dye to be sublimed is dependent on thermal energy and the density after dyeing can be controlled in an analog manner.

Indoaniline compounds have attracted particular interests as sublimation-transferable cyan dyes (Japanese Patent Application Laid-Open Nos. 239289/1985, 19396/1986, 22993/1986, 31292/1986 and 308072/1988 and 53893/1989). Although many of these indoaniline compounds are extremely good from the viewpoint of hue, there are only a very small number of indoaniline compounds having various properties required as sublimable dyes such as storage stability and light fastness after transfer, transfer sensitivity.

As a method for improving the transfer sensitivity, it may be contemplated, for example, to reduce the molecular weight. This may however lead to impairment in the post-transfer storage stability. On the other hand, to improve the light fastness and storage stability, introduction of one or more substituents is essential. This however results in an increased molecular weight, thereby not only reducing the transfer sensitivity but also impairing the color hue in many instances.

DISCLOSURE OF INVENTION

The present inventors have carried out an extensive investigation with a view toward overcoming the problems described above. As a result, compounds represented by formula (I) have been found, leading to the completion of the present invention.

The present invention provides a heat-sensitive sublimation transfer cyan dye represented by the following formula (I):

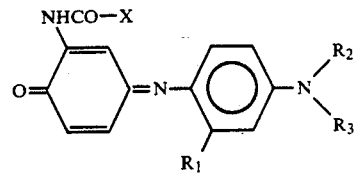

wherein $R_1$ represents a hydrogen atom, an alkyl group, an alkoxyl group, an alkylcarbonylamino group, a formylamino group or a halogen atom, $R_2$ and $R_3$ represent an alkyl group, an alkenyl group, an alkoxyalkyl group, an aralkyl group, an aryl group, a halogenoalkyl group or a cyanoalkyl group or are coupled together to form a ring, and X represents any one of the following groups:

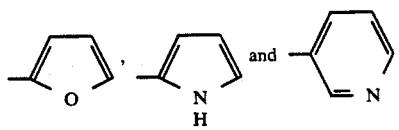

as well as a heat-sensitive sublimation transfer sheet comprising one or more dyes selected from the group consisting of the dyes represented by the formula (I)

BEST MODE FOR CARRYING OUT THE INVENTION

The present invention will hereinafter be described in detail.

Illustrative of $R_1$ include $C_1$–$C_3$ lower alkyl groups such as methyl, ethyl, n-propyl and isopropyl; alkoxyl groups such as methoxy, ethoxy and n-propoxy; alkylcarbonylamino groups such as methylcarbonylamino, ethylcarbonylamino and n-propylcarbonylamino; formylamino groups; and halogen atoms such as chlorine and fluorine.

Preferable examples of $R_1$ include a hydrogen atom, a methyl group, a thyl (sic.) group, a methoxy group and a chlorine atom.

Examples of $R_2$ and $R_3$ include $C_1$–$C_8$ alkyl groups such as methyl, ethyl, n-propyl, iso-propyl, n-butyl, n-pentyl, n-hexyl, n-heptyl and n-octyl; alkenyl groups such as allyl, crotyl, 2-butenyl and 3-butenyl; alkoxyalkyl groups such as methoxymethyl, ethoxyethyl, methoxyethyl and ethoxymethyl; aralkyl groups such as benzyl and phenethyl; aryl groups such as phenyl, p-methylphenyl, m-methylphenyl, o-methylphenyl, p-methoxyphenyl, m-methoxyphenyl and o-methoxyphenyl; halogenoalkyl groups such as chloromethyl, 2-chloroethyl, 2-chloropropyl and 3-chloropropyl; and cyanoalkyl groups such as cyanomethyl and cyanoethyl. $R_2$ and $R_3$ may be coupled to form a ring as shown below.

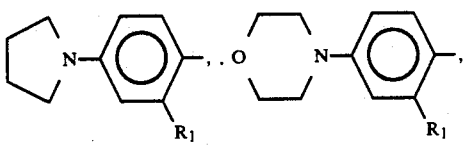

-continued

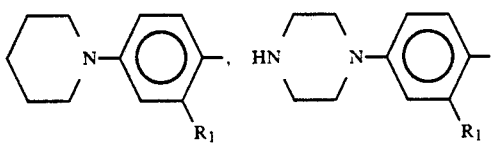

Preferable examples of $R_2$ and $R_3$ include an ethyl group, an n-propyl group, an iso-propyl group, an n-butyl group, an allyl group, a crotyl group, a methoxyethyl group, a benzyl group, a 2-chloroethyl group and a cyanoethyl group.

Examples of X include the following groups:

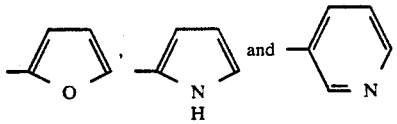

According to the investigation by the present inventors, it has been found that the velocity of sublimation of a sublimation transferable dye at the time of its transfer is generally governed by intermolecular action of the dye and interaction between dye molecules and an ink-forming binder resin.

It has become clear that to be a good dye, the dye has good solubility in an ink solvent, a lower melting point within a range usable in thermal transfer systems, small interaction with an ink-forming binder resin and a low molecular weight sufficient to avoid impairment to the storage stability after the production of ink ribbons. Among indoaniline compounds of this kind, those having a molecular weight of 300–420 are preferred, and those with a molecular weight of 350–400 are more preferred. Turning to the melting point, those having a melting point of 100°–200° C. are preferred, with those of 120°–150° C. being more preferred. The dye of the present invention represented by the formula (I) can meet all the various requirements described above and can provide a good sublimation velocity.

Preparation of the dye of the present invention represented by the formula (I) can be conducted by oxidative coupling of substituted anilines and substituted phenols.

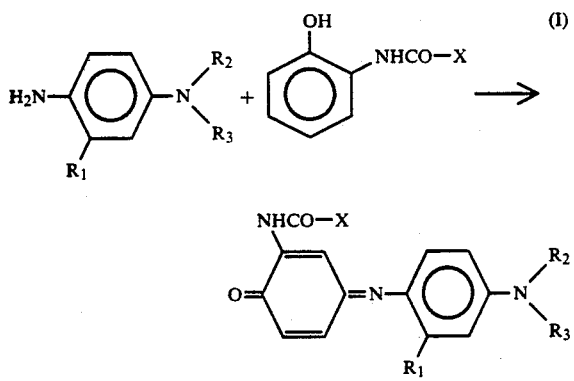

To formulate heat-sensitive transfer recording ink from the dye of the present invention, it is only necessary to mix them with suitable resin, solvent and the like into such recording ink.

Thermal transfer can be carried out, for example, by coating an appropriate base material with one of the above-formulated ink to prepare a transfer sheet, bringing the transfer sheet into a contiguous relationship with a material on which a record is to be formed, and then applying heat and pressure by a thermal recording head from the back side of the sheet. This causes transfer of the dye from the sheet onto the recorded material.

As resins for formulating the ink described above, any resins employed in conventional printing ink can be used. Usable resins include oil soluble resins such as rosin resins, phenol resins, xylene resins, petroleum resins, vinyl resins, polyamide resins, alkyd resins, nitrocellulose resins and alkylcellulose resins, and water soluble resins such as maleic resins, acrylic resins, casein resins, shellac resins and animal glue resins.

Exemplary solvents suitable for use of the formulation of ink include alcohols such as methanol, ethanol, propanol and butanol; cellosolves such as methylcellosolve and ethylcellosolve; aromatic solvents such as benzene, toluene and xylene; esters such as ethyl acetate and butyl acetate; ketones such as acetone, methyl ethyl ketone and cyclohexanone; hydrocarbons such as ligroin, cyclohexane and kerosine; and dimethylformamide. When the water soluble resins are used, water or mixtures of water and the abovedescribed solvents can be employed.

Suitable examples of base materials which are coated with an ink include thin papers such as condenser paper and glassine paper as well as plastic films having good heat resistance such as polyester, polyamide and polyimide films. Suitably, these base materials have a thickness on the order of 5–50 μm to provide good efficiency of heat transfer from thermal recording heads to dyes.

Examples of materials to be recorded include fibers, woven fabrics, films, sheets, other molded or extruded articles, which can be made of polyolefin resins such as polyethylene and polypropylene; halogenated polymers such as polyvinyl chloride and polyvinylidene chloride; vinyl polymers such as polyvinyl alcohol, polyvinyl acetate and polyacrylic esters; polyester resins such as polyethylene terephthalate and polybutylene terephthalate; polystyrene resins; polyamide resins; copolymer resins, e.g., those of olefins—such as ethylene and propylene —and other vinyl monomers; ionomers; cellulose resins such as cellulose diacetate and cellulose triacetate; polycarbonates; polysulfons; polyimides; or the like.

Particularly preferred are woven fabrics, sheets and films, which are made of polyethylene terephthalate.

According to the present invention, good records having excellent picture stability at elevated temperatures and humidities by using general-purpose paper sheets either coated or impregnated with a mixture of such a resin and fine acidic particles such as silica gel, laminates of resin films, or specially converted, i.e., acetylated paper sheets. Further, films of various resins and converted paper sheets made of such films can also be used.

It is also possible to improve colors produced from the dyes and to stabilize the storage of records by heat-pressing, for example, polyester films on transfer-recorded surfaces to form laminates subsequent to the transfer recording.

The cyan dyes of the present invention represented by the formula (I) permit easy tonal recording and are suitable for use in full-color recording, because the rates of sublimation transfer of the cyan dyes can be controlled by varying the energy to be applied to thermal heads at the time of thermal transfer.

They are also stable to heat, light, moisture, chemicals and the like, so that they are not subjected to thermal decomposition during transfer recording and the resulting records enjoy excellent storability.

In addition, the dyes of the present invention have good solubility in organic solvents and good dispersibility persibility in water. It is therefore easy to formulate them into high-concentration ink in which they are evenly dissolved or dispersed. As a result, records having good color density can be obtained. The dyes of the present invention are hence valuable from the practical viewpoint.

The present invention will hereinafter be described in detail in the following examples, in which all designations of "part" or "parts" mean part or parts by weight

EXAMPLE 1

Synthesis of the compound of the below-described formula (A) was conducted in the following manner:

A solution of 10 parts of 4-diethylamino-o-toluidine dissolved in 63 parts of chloroform and another solution of 11.4 parts of o-furoylaminophenol dissolved in 30 parts of N,N-dimethylformamide were added to 63 parts of water. After 31 parts of 25% aqueous ammonia were added dropwise, 25.5 parts of ammonium persulfate were added over about 1 hour while the liquid temperature was maintained at 20° C. They were then reacted for 2 hours at room temperature. After the reaction, the reaction mixture was separated, washed thoroughly with water, and then purified by column chromatography so that the target compound (A) was obtained.

Using the compound of the formula (A), an ink of the below-described composition was also formulated. A transfer sheet and a material to be recorded were also prepared. Transfer recording was then performed.

Incidentally, the wavelength at the maximum absorption, λmax, of the compound in chloroform was 645 nm (molecular weight: 377).

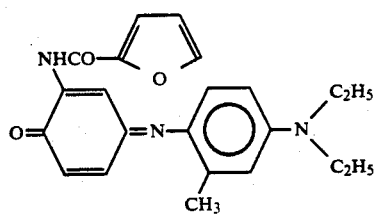
(A)

(i) Formulation method of the ink

| Dye of the formula (A) | 3 parts |
| Polybutyral resin | 4.5 parts |
| Methyl ethyl ketone | 46.25 parts |
| Toluene | 46.25 parts |

The ink was formulated by mixing a dye mixture of the above composition together with glass beads of about 30 minutes in a paint conditioner.

(ii) Preparation method of the transfer sheet

Using a gravure proof press (groove depth: 30 μm), the above ink was coated on a 9-μm thick polyethylene terephthalate film, which had been subjected to heat-resisting treatment on the back side thereof, to give a dry coat weight of 1.0 g/m². The film so coated was then dried.

| (iii) Preparation of the material to be recorded | |
|---|---|
| Polyester resin ("VYLON 103", trade name; product of Toyobo Co., Ltd.; Tg: 47° C.) | 0.8 part |
| EVA type, high-molecular plasticizer ("ELVALOY 741P", trade name; product of Mitsui Polychemicals, Inc.; Tg: −37° C.) | 0.2 part |
| Amino-modified silicone ("KF-857", trade name; product of Shin-Etsu Chemical Co., Ltd.) | 0.04 part |
| Epoxy-modified silicone ("KF-103", trade name; product of Shin-Etsu Chemical Co., Ltd.) | 0.04 part |
| Methyl ethyl ketone/toluene/ cyclohexane (weight ratio: 4:4:2) | 9.0 parts |

The above components were mixed to prepare a coating formulation. A synthetic paper ("YUPO FPG#150", trade name; product of Oji-Yuka Synthetic Paper Co., Ltd.) was coated with the coating formulation by a bar coater (Model No. 1; manufactured by R K Print Coat Instruments) to give a dry coat weight of 4.5 g/m², followed by drying at 100° C. for 15 minutes.

(iv) Transfer recording

The above transfer sheet and the material to be recorded were brought into a contiguous relationship with the ink-coated side and the formulation-coated side facing each other. From the back side of the thermal transfer sheet, recording was performed under the conditions of 10 V thermal head application voltage and 4.0 msec printing time, whereby a cyan-colored record having a color density of 2.95 was obtained.

Incidentally, the color density was measured using a densitometer "Model RD-514" (filter: Wratten No. 58) manufactured by Macbeth Company, U.S.A.

The color density was calculated in accordance with the following equation:

$$\text{Color density} = \log_{10}(I_o/I)$$

where
- $I_o$: Intensity of light reflected from a standard white reflector plate, and
- $I$: Intensity of light reflected from the sample object.

A light fastness test of the record thus obtained was also conducted at a black panel temperature of 63°±2° C. by using a xenon fademeter manufactured by Suga Testing Machines Co., Ltd. No substantial color variation was observed after 40-hours exposure. The stability of the picture was also excellent even at the elevated temperature and humidity.

In addition, the durability was judged based on the degree of sharpness of the recorded picture after the picture was left over for 48 hours in an atmosphere of 50° C. and also on the extent of tinge of a white paper sheet when the recorded surface was rubbed with the white paper sheet. The sharpness of the picture remained unchanged and the white paper sheet was not tinged, whereby the recorded picture demonstrated good durability.

EXAMPLE 2

Synthesis of the compound of the below-described formula (B) was conducted in the following manner: Eleven parts of p-allylethylamino-o-toluidine and 11.4 parts of o-furoylaminophenol were dissolved in a liquid mixture consisting of 63 parts of methanol and 38 parts of water, followed by the addition of 31 parts of 25% aqueous ammonia. While the liquid temperature was maintained at 20° C., 76.6 parts of a 25% aqueous solution of silver nitrate were added dropwise over about 1 hour. They were then reacted for 2 hours at room temperature. After the reaction, the reaction mixture was extracted with chloroform. The extract was thoroughly washed with water and then purified by column chromatography, so that the target compound (B) was obtained.

The wavelength at the maximum absorption, λmax, of the compound in chloroform was 640 nm (molecular weight: 389).

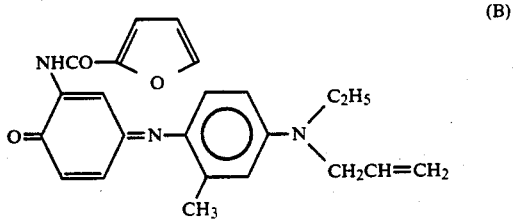
(B)

Similarly to Example 1, an ink was formulated, a transfer sheet and a material to be recorded were prepared, and transfer recording was performed, whereby cyan-colored records having a color density of 2.95 was obtained.

Those records were subjected to a light fastness test in a similar manner to Example 1. The records did not undergo any substantial variations, so that the pictures had excellent stability at the elevate temperature and humidity.

In addition, a durability test was conducted in a similar manner to Example 1. The sharpness of the picture did not change and the white paper was not tinged. The durability of the recorded pictures was therefore good.

EXAMPLES 3-14

Following the procedures of Example 1, the cyan dyes shown in Table 1 were prepared. Similarly to Example 1, ink was formulated, transfer sheets and materials to be recorded were prepared, and transfer recording was performed. The various records shown in Table 1 were obtained.

Those records were all subjected to a light fastness test in a similar manner to Example 1. Those records did not undergo any substantial variations, so that the pictures showed excellent stability at the elevated temperature and humidity.

In addition, a durability test was also conducted in a similar manner to Example 1. The sharpness of the pictures did not change and the white paper sheets were not tinged. The durability of the recorded pictures was therefore good.

TABLE 1

| Ex. | Structural formula | M.W. | λmax (nm) | Maximum density transferred |
|---|---|---|---|---|
| 3 | | 363 | 640 | 3.00 |
| 4 | | 388 | 645 | 2.95 |
| 5 | | 374 | 640 | 3.00 |

TABLE 1-continued
| Ex. | Structural formula | M.W. | λmax (nm) | Maximum density transferred |
|---|---|---|---|---|
| 6 |  | 407 | 640 | 2.80 |
| 7 | 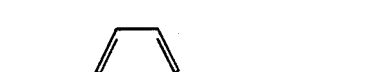 | 402 | 635 | 2.85 |
| 8 | 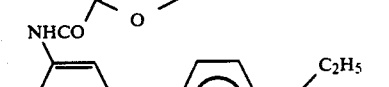 | 411.5 | 638 | 2.75 |
| 9 | 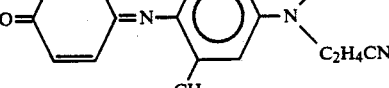 | 411 | 655 | 2.75 |
| 10 | 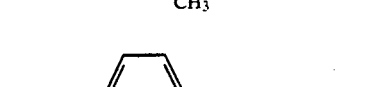 | 411 | 650 | 2.75 |
| 11 | 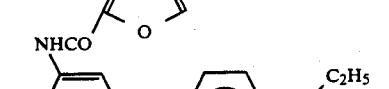 | 361 | 640 | 2.95 |
| 12 | 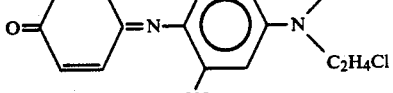 | 362 | 630 | 2.70 |

TABLE 1-continued

| Ex. | Structural formula | M.W. | λmax (nm) | Maximum density transferred |
|---|---|---|---|---|
| 13 | (structure with pyrrole-NHCO, quinone, diallylamine, CH₃) | 400 | 625 | 2.70 |
| 14 | (structure with furan-NHCO, quinone, morpholine, NHCHO) | 420 | 670 | 2.70 |
| 15 | (structure with pyridine-NHCO, quinone, N(C₂H₅)₂, Cl) | 408.5 | 630 | 2.70 |
| 16 | (structure with pyridine-NHCO, quinone, N(C₂H₅)₂, OCH₃) | 404 | 655 | 2.80 |
| 17 | (structure with pyridine-NHCO, quinone, morpholine, CH₃) | 402 | 645 | 2.85 |
| 18 | (structure with pyridine-NHCO, quinone, N(C₂H₄Cl)(C₂H₅)) | 408.5 | 640 | 2.80 |

TABLE 1-continued

| Ex. | Structural formula | M.W. | λmax (nm) | Maximum density transferred |
|---|---|---|---|---|
| 19 | (structure: NHCO-pyridyl, quinone imine, N(CH₃)₂, NHCOCH₃) | 403 | 670 | 2.65 |
| 20 | (structure: NHCO-pyridyl, quinone imine, N(C₂H₅)₂, NHCHO) | 417 | 665 | 2.65 |
| 21 | (structure: NHCO-pyridyl, quinone imine, N(C₂H₅)(C₂H₄CN), CH₃) | 413 | 635 | 2.80 |
| 22 | (structure: NHCO-pyridyl, quinone imine, N(phenyl)(CH₃)) | 408 | 650 | 2.50 |
| 23 | (structure: NHCO-pyridyl, quinone imine, piperidino, CH₃) | 400 | 645 | 2.70 |
| 24 | (structure: NHCO-pyridyl, quinone imine, N(CH₃)(CH₂CH₂OC₂H₅), CH₃) | 418 | 650 | 2.70 |

COMPARATIVE EXAMPLE 1

Using a dye having a molecular weight of 420 and represented by the following structural formula (a):

(a)

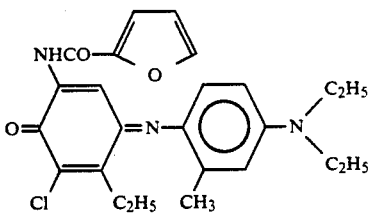

an ink was formulated, a transfer sheet and a material to be recorded was prepared, and transfer recording was performed, as in Example 1. As a result, a cyan-colored record having a color density of 2.21 was obtained. It was only possible to obtain the above color density which was much lower compared to those obtained by using the respective dyes of the examples.

COMPARATIVE EXAMPLE 2

Using a color having a molecular weight of 400 and represented by the following structural formula (b):

(b)

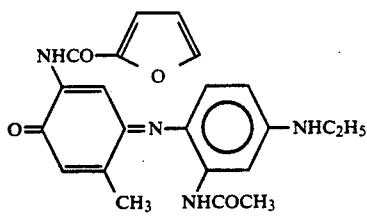

an ink was formulated, a transfer sheet and a material to be recorded was prepared, and transfer recording was performed, as in Example 1. As a result, relatively good results that the color density was 2.76 were obtained. Its color was however too reddish as a cyan color as indicated by the wavelength of 612 nm at the maximum absorption. It was therefore found practically unusable.

We claim:

1. A heat-sensitive sublimation transfer cyan dye represented by the following formula (I):

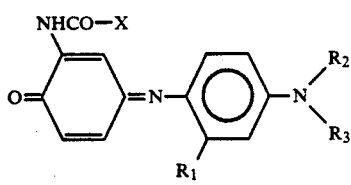 (I)

wherein $R_1$ represents a hydrogen atom, an alkyl group, an alkoxyl group, an alkylcarbonylamino group, a formylamino group or a halogen atom, $R_2$ and $R_3$ represent an alkyl group, an alkenyl group, an alkoxyalkyl group, an aralkyl group, an aryl group, a halogenoalkyl group or a cyanoalkyl group or are coupled together to form a ring, and X represents any one of the following groups:

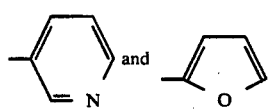

2. A cyan compound of claim 1, wherein $R_1$ in formula (I) is a hydrogen atom or a methyl group.

3. A cyan dye of claim 1, wherein, in formula (I), X is

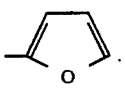

4. A cyan dye of claim 4, wherein, in formula (I), $R_2$ and $R_3$ each are an alkyl group.

5. A cyan dye of claim 4, wherein, in formula (I), $R_2$ and $R_3$ each are an ethyl group.

6. A cyan dye of claim 1, wherein, in formula (I), X is

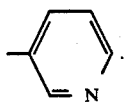

7. A cyan dye of claim 7, wherein, in formula (I), $R_2$ and $R_3$ each are an alkyl group.

8. A cyan dye of claim 7, wherein, in formula (I), $R_2$ and $R_3$ each are an ethyl group.

9. A heat-sensitive sublimation transfer sheet comprising one or more dyes selected from the group consisting of dyes represented by the following formula (I):

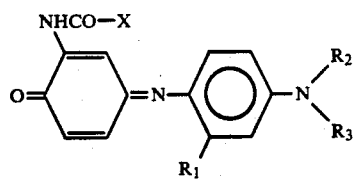 (I)

wherein $R_1$ represents a hydrogen atom, an alkyul group, an alkoxyl group, an alkylcarbonylamino group, a formylamino group or a halogen atom, $R_2$ and $R_3$ represent an alkyl group, an alkenyl group, an alkoxyalkyl group, an aralkyl group, an aryl group, a halogenoalkyl group or a cyanoalkyl group or are coupled together to form a ring, and X represents any one of the following groups:

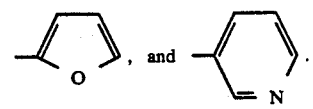

10. A transfer sheet according to claim 2, wherein, in formula (I), $R_1$ is a hydrogen atom or a methyl group.

11. A transfer sheet according to claim 9, wherein, in formula (I), X is

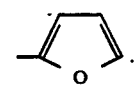

12. A transfer sheet according to claim 11, wherein $R_2$ and $R_3$ each are an alkyl group.

13. A transfer sheet according to claim 11, wherein $R_2$ and $R_3$ each are an ethyl group.

14. A transfer sheet according to claim 9, wherein, in formula (I), X is

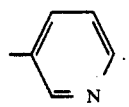
15. A transfer sheet according to claim 14, wherein $R_2$ and $R_3$ each are an alkyl group.
16. A transfer sheet according to claim 14, wherein $R_2$ and $R_3$ each are an ethyl group.
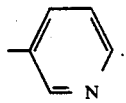
15. A transfer sheet according to claim 14, wherein $R_2$ and $R_3$ each are an alkyl group.
16. A transfer sheet according to claim 14, wherein $R_2$ and $R_3$ each are an ethyl group.
* * * * *